Nov. 12, 1946.           A. M. ROCKWELL           2,411,000
                   LIQUID TYPE VIBRATION DAMPER
                       Filed March 30, 1944
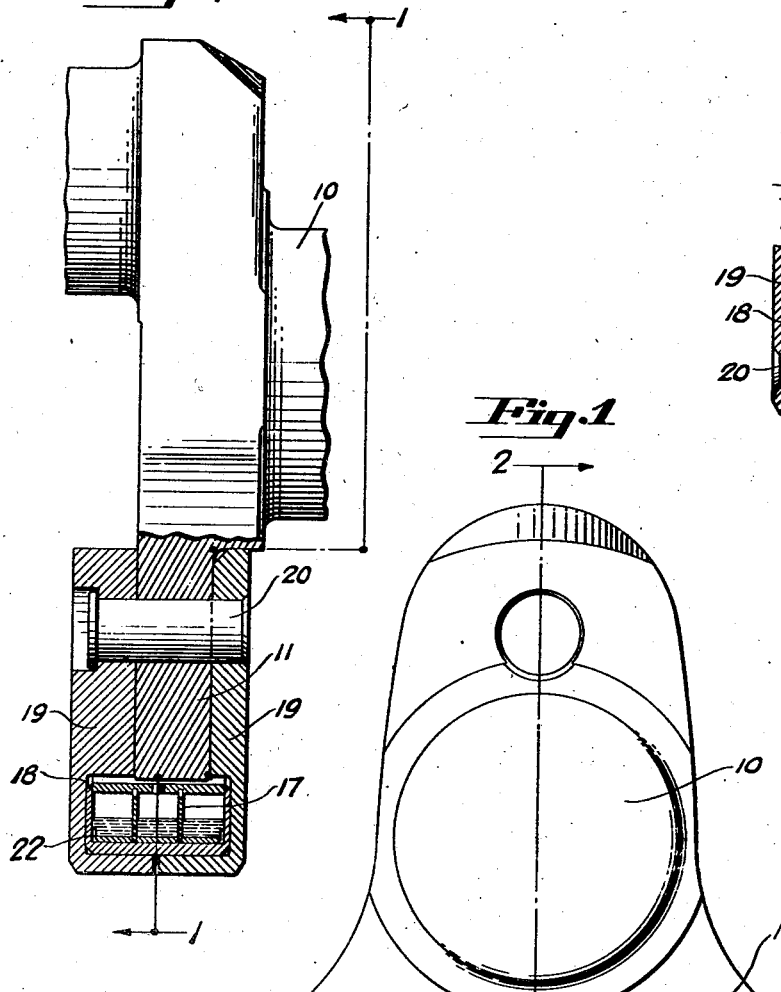
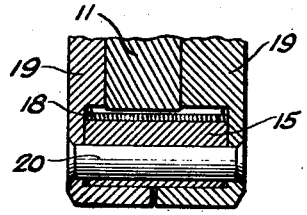
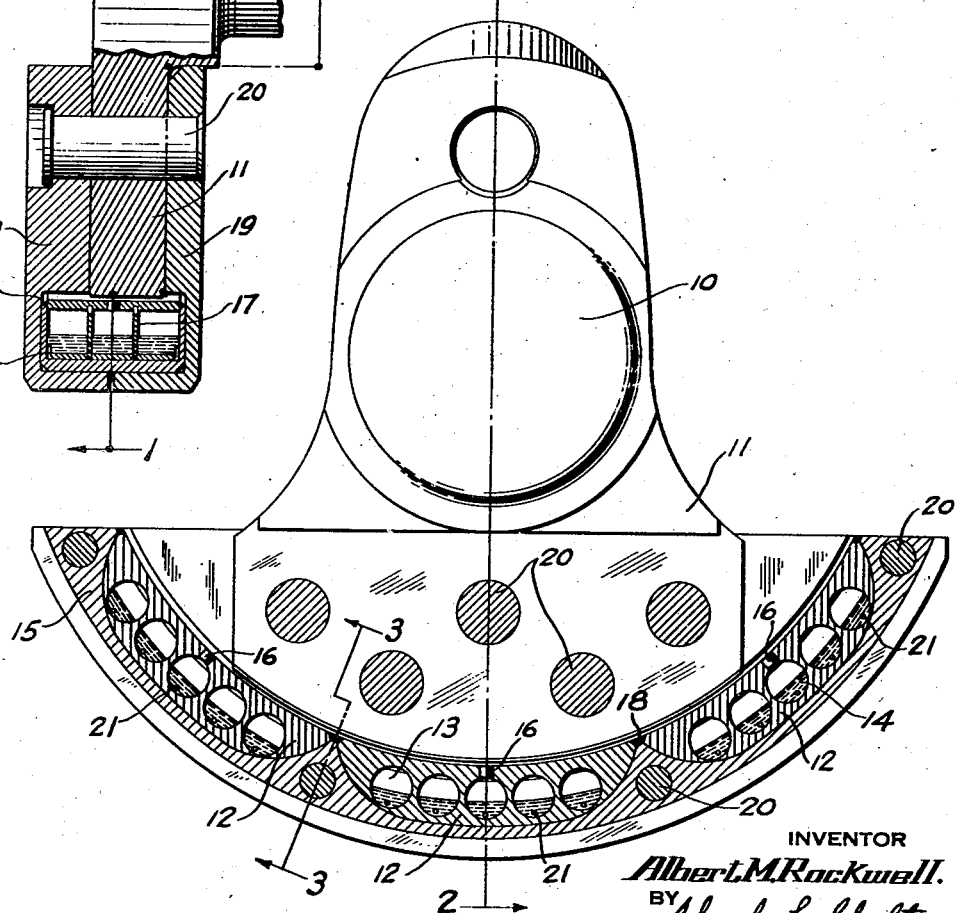
INVENTOR
*Albert M. Rockwell.*
BY *Charles L. Shelton*
ATTORNEY Patented Nov. 12, 1946

2,411,000

UNITED STATES PATENT OFFICE 2,411,000

LIQUID TYPE VIBRATION DAMPER

Albert M. Rockwell, Glastonbury, Conn., assignor to United Aircraft Corporation, East Hartford, Conn., a corporation of Delaware Application March 30, 1944, Serial No. 528,707

2 Claims. (Cl. 74—604)

This invention relates to vibration dampers and particularly to a combined torsional and translational or axial vibration damper of the liquid pendulum type.

The invention is shown, in the embodiment selected for illustration, as applied to the crankshaft of an aircraft engine and is housed within one or more of the counterbalances therefor, there preferably being a plurality of containers forming dampers in each counterbalance and each container having therein a plurality of small openings forming pockets partially filled with a heavy liquid such as mercury.

An object of the invention is to provide a vibration damping means for crankshafts and the like in which the liquid, preferably mercury, is retained within a container and being sealed in a manner to prevent the pressure of the liquid, due to centrifugal force, from being applied against any of the soldered or welded joints of the containers.

Another object of the invention is to enclose the mercury or other liquid holding containers within recesses within opposed counterweight members secured to the crankshaft on opposite sides of the crank cheeks.

Other objects and advantages will be apparent from the specification and claims, and from the drawing which illustrates what is now considered to be a preferred embodiment of the invention.

In the drawing:

Fig. 1 is a side elevation of a crankshaft showing a preferred form of the invention, parts being shown in section on the plane of line 1—1 in Fig. 2;

Fig. 2 is a transverse sectional view on an enlarged scale and taken on the plane of line 2—2 in Fig. 1, and Fig. 3 is a transverse sectional view taken on the planes of broken line 3—3 of Fig. 1.

In a preferred form the invention may include the following principal parts: First, a rotating member; second, one or more containers housing a plurality of small chambers or spaced receptacles for a liquid such as mercury; and third, means retaining the container and its contents in position on the crank cheek or other portion of a rotating member.

Referring more in detail to the figures of the drawing, there is shown a counterweight portion 11 of an aircraft engine crankshaft 10. To this counterweight portion 11 are secured a group of three similar containers 12 each container having a plurality of cylindrical compartments 13 partially filled with a heavy liquid 14 such as mercury.

Each of the containers 12 is provided with the mercury pockets or receptacles 13 and each may be curved as shown to fit a portion of the outer periphery of the counterweight 11 against which the containers 12 may be mounted. Each pocket or receptacle 13 extends transversely through its container 12 and each pocket is partially filled with liquid 14 such as mercury. To enclose these containers 12, a cap member 15 fitting their outer periphery, the sides and ends of the containers 12 is welded thereto throughout the edges of the cap member 15. As shown in Fig. 2, the edge of the cap member 15 welded to the containers 12 extends along its inner arcuate surface so that during rotation centrifugal force will not serve to bring the liquid into contact with the weld or other form of joint 18. The inner arcuate surfaces of the containers 12 are provided with a single opening 16, by means of which liquid may be admitted to the individual receptacles. After filling each receptacle to the desired level or with the required amount of liquid, this opening may be closed by a plug filling the opening 16, the outer end of which may be welded to the container 12 to retain it in liquid tight relation thereto.

As shown most clearly in Fig. 2, the containers 12 for the pockets 13 are fitted into recesses milled or otherwise formed in the cap member 15, there being as shown, three aligned recesses in the cap member 15 for these containers.

Each of the pockets 13 for the liquid 14 may be divided into compartments by separating diaphragms 17 held spaced apart by being fitted into milled grooves formed in the walls of the pockets. To permit passage of liquid from one portion to another of the pockets 13, small openings 21 through the diaphragms 17 may be provided. Also, to permit fluid to pass from one pocket to another, slight openings may be formed as indicated at 22 between the side walls of the containers and the cap member.

To retain the containers 12 and the cap member 15 in position, counterweight cheeks or closing members 19 recessed to receive the containers and cap member may be bolted together on opposite sides of the crank cheek 11. These cheeks or closing members 19 may be held in position by through bolts or rivets 20 extending transversely through the opposed closing members 19 and through a portion of the crankshaft counterweight 11.

As shown in Fig. 1, there are three similar container members 12 placed end to end and enclosed by a single cap member 15 so that in effect there is a continuous series of liquid containing pockets 13 from one end surface of the crank cheek to the other. The pockets 13 for the liquid are arranged with their axes parallel to each other and parallel to the axis of rotation of the crankshaft. All of the pockets 13, therefore, form an arcuate series concentric with the axis of rotation of the crankshaft.

In operation fluctuations in the instantaneous speeds of the crankshaft 10, due to intermittent power impulses, will cause the fluid within each pocket or receptacle 13 to move forward or backward, also axial or translatory vibrations of the crankshaft will cause movement of the mercury in the direction lengthwise of the receptacles or pockets 13. This action of the mercury serves to vary the inertia of the rotating mass and effects a damping of these torsional and axial vibrations.

In operation also the construction provides a large number of spaced pockets within which the liquid can flow to uniformly fill all pockets to an equal degree, and as the weld between the containers and their cap member is on the inner radius of the cap member, centrifugal force does not force mercury against this joint. The order of the vibrations acting upon the crankshaft determines the dimensions of the pockets and their distance from the axis of rotation. The greater the distance from the axis of rotation, the larger the pockets may be, and also the greater the effectiveness of the enclosed liquid will be because of this greater radius.

It is to be understood that the invention is not limited to the specific embodiment herein illustrated and described, but may be used in other ways without departure from the spirit of the invention as defined by the following claims.

I claim:

1. A vibration damper of the liquid pendulum type comprising, a rotatable member, a container mounted thereon having a plurality of pockets, a liquid partially filling each of said pockets, means to restrict but not prevent liquid flowing from one pocket to another, said container having a filling opening extending from the inner surface of said container, a cap member secured to and enclosing the outer and side portions of said container for retaining said liquid within said pockets and retaining said pockets in an arcuate series, said container and cap member being permanently secured together along the periphery of said cap member, and means to secure said container in fixed position to said rotatable member.

2. A vibration damper of the liquid pendulum type comprising, a rotatable member, a container mounted thereon having a series of parallelly disposed pockets, a liquid partially filling each of said pockets, means to restrict but not prevent liquid flowing from one pocket to another, said container having a filling opening therefor extending from the inner surface of said container, a plug sealing said opening, a cap member secured to and enclosing the outer and side portions of said container for retaining said liquid within said pockets and retaining said pockets in an arcuate series, said container and cap member being permanently secured together along the periphery of said cap member, and means to secure said container in fixed position to said rotatable member.

ALBERT M. ROCKWELL.